(12) United States Patent
Kim et al.

(10) Patent No.: US 9,980,150 B2
(45) Date of Patent: May 22, 2018

(54) NODE DEVICE, NETWORK SYSTEM, AND METHOD FOR DISCOVERING NEIGHBOR OF NODE DEVICE IN TVWS COMMUNICATION ENVIRONMENT

(71) Applicant: AJOU UNIVERSITY INDUSTRY-ACADEMIC COOPERATION FOUNDATION, Suwon-si, Gyeonggi-do (KR)

(72) Inventors: Jae Bum Kim, Suwon-si (KR); Ji Na Han, Suwon-si (KR); Young Bae Ko, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 117 days.

(21) Appl. No.: 15/048,070

(22) Filed: Feb. 19, 2016

(65) Prior Publication Data
US 2016/0249391 A1   Aug. 25, 2016

(30) Foreign Application Priority Data
Feb. 25, 2015  (KR) .................. 10-2015-0026603

(51) Int. Cl.
*H04W 16/14* (2009.01)
*H04W 8/00* (2009.01)

(52) U.S. Cl.
CPC ............ *H04W 16/14* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 2006/0088010 A1* | 4/2006 | Buchwald | ............. | H04W 16/14 370/338 |
| 2009/0102981 A1* | 4/2009 | Mody | ...................... | H04K 3/22 348/732 |
| 2011/0043710 A1* | 2/2011 | Samarasooriya | ..... | H03J 1/0091 348/735 |
| 2011/0164186 A1* | 7/2011 | Sadek | ................... | H04H 20/33 348/724 |

(Continued)

FOREIGN PATENT DOCUMENTS

| | | |
|---|---|---|
| KR | 10-2013-0093011 A | 8/2013 |
| KR | 10-2014-0009735 A | 1/2014 |
| WO | 2014/027808 A1 | 2/2014 |

OTHER PUBLICATIONS

Korean Office Action for corresponding Application No. 10-2015-0026603 dated May 23, 2016.

*Primary Examiner* — Jamal Javaid
*Assistant Examiner* — Rose Clark
(74) *Attorney, Agent, or Firm* — Sughrue Mion, PLLC (57) ABSTRACT

A node device using a TV white space (TVWS) includes a decision unit for comparing energy levels of a first sub-channel and at least one second sub-channel adjacent to the first sub-channel among a plurality of sub-channels with respect to a digital TV (DTV) channel including the plurality of sub-channels and deciding whether the DTV channel is an available channel, and a discovery unit for, if the DTV channel is decided as the available channel, discovering a beacon by scanning the first sub-channel in the DTV channel.

15 Claims, 7 Drawing Sheets

(56) References Cited

U.S. PATENT DOCUMENTS

| | | | |
|---|---|---|---|
| 2011/0169965 A1* | 7/2011 | Kim | H04N 17/004 348/181 |
| 2011/0280413 A1* | 11/2011 | Wu | H03J 1/0091 381/77 |
| 2014/0029585 A1* | 1/2014 | Freda | H04W 16/14 370/336 |
| 2014/0045514 A1* | 2/2014 | Lee | H04W 16/14 455/454 |

* cited by examiner

NODE DEVICE, NETWORK SYSTEM, AND METHOD FOR DISCOVERING NEIGHBOR OF NODE DEVICE IN TVWS COMMUNICATION ENVIRONMENT

CROSS REFERENCE TO RELATED APPLICATIONS

This application claims priority from Korean Patent Application No. 10-2015-0026603, filed on Feb. 25, 2015, in the Korean Intellectual Property Office, the contents of which are incorporated herein by reference in their entireties.

BACKGROUND

1. Field

The inventive concept relates to a node device using a TV white space (TVWS), a TVWS network system, and a method for discovering a neighbor of a node device in a TVWS communication environment.

2. Description of Related Art

A smart grid network is an electrical grid infrastructure integrated with an IT communication system so as to provide efficient control and management. The smart grid network may be classified into three types of networks, i.e., a wide area network (WAN), a neighborhood area network (NAN), and a home area network (HAN). The HAN focuses small-scale data communication between electrical appliances or energy systems in a home. The HAN is also called as a last-mile smart grid (LMSG) or advanced metering infrastructure (AMI) network.

One of important characteristics of the AMI network for enabling the implementation of an accurate smart grid system is high reliability. In order to provide stable data communication, fiber and power line communication (PLC) networks are widely used in current AMI networks, but the scalability and flexibility of wired network systems are limited. In order to the limitation of the wired network systems, wireless communication protocols such as IEEE 802.15.4, IEEE 802.11, and Bluetooth are considered as solutions for AMI applications and network stack protocols.

Recently, a TV white space (TV white space) has come into the spotlight in relation to the AMI network. The TVWS is an idle portion of a digital TV (DTV) frequency band between 54 MHz and 862 MHz, and refers to a band accessible when the band is not used by TV and radio broadcasting. For various reasons of communication scope, reliability, stability, etc., an IEEE 802.15.4m TVWS protocol is considered in a smart grid network environment. The IEEE 802.15.4m TVWS protocol has an advantage in that it can build a stable AMI network, but has a problem in that a neighbor discovery delay caused when unsubscribed devices subscribe a network is rapidly increased as the number of communication channels increases.

An embodiment of the inventive concept is directed to a node device, a network system, and a method for discovering a neighbor of a node device in TV white space (TVWS) communication environment, which can reduce a neighbor discovery delay in the TVWS communication environment.

SUMMARY

According to an aspect of the inventive concept, there is provided a node device using a TV white space (TVWS), comprising: a decision unit configured to compare energy levels of a first sub-channel and at least one second sub-channel adjacent to the first sub-channel among a plurality of sub-channels with respect to a digital TV (DTV) channel including the plurality of sub-channels and decide whether the DTV channel is an available channel; and a discovery unit configured to, if the DTV channel is decided as the available channel, discover a beacon by scanning the first sub-channel in the DTV channel.

According to example embodiments, wherein the first sub-channel may be a sub-channel corresponding to the center frequency band of the DTV channel, and the second sub-channel may be a sub-channel corresponding to a frequency band adjacent to the center frequency band of the DTV channel.

According to example embodiments, wherein the frequency band of the second sub-channel may be continued to that of the first sub-channel.

According to example embodiments, wherein the frequency band of the second sub-channel may be not continued to that of the first sub-channel.

According to example embodiments, wherein the decision unit may calculate a correlation value between the energy level of the first sub-channel and the energy level of the second sub-channel, and decide whether the DTV channel is the available channel by comparing the calculated correlation value with a predetermined critical value.

According to example embodiments, wherein the correlation value may be calculated according to the following equation.

$$R_{xy} = \left| \frac{n\sum x_i y_i - \sum x_i \sum y_i}{\sqrt{n\sum x_i^2 - (\sum x_i)^2} \sqrt{n\sum y_i^2 - (\sum y_i)^2}} \right| \quad (0 < R_{xy} \leq 1),$$

where x denotes the energy level of the first sub-channel, and y denotes the energy level of the second sub-channel.

According to example embodiments, wherein the decision unit may measure the energy level of the first sub-channel and the energy level of the second sub-channel by using clear channel assessment (CCA).

According to example embodiments, the node device may further comprise a network connection unit configured to perform a connection procedure on a TVWS network by using the discovered beacon.

According to another aspect of the inventive concept, there is provided a TVWS network system, comprising: a first node device configured to select, as an available channel, at least one DTV channel among a plurality of DTV channels, based on acquired available channel information, and transmit a beacon by using a pilot channel in the DTV channel selected as the available channel; and a second node device configured to compare energy levels of a pilot channel in a DTV channel corresponding to each of the plurality of DTV channel and at least one adjacent channel, decide whether the corresponding DTV channel is the DTV channel selected as the available channel, and discover a beacon by scanning the pilot channel in the DTV channel selected as the available channel.

According to example embodiments, wherein each of the plurality of DTV channels may include a plurality of sub-channels, and wherein the first node device and the second node device may select any one of the plurality of sub-channels as the pilot channel according to the following equation.

$$PilotChannel_i = \left(i \times \frac{TV_s}{M_S}\right) - \left(\frac{TV_s/M_s}{2}\right),$$

where PilotChanneli denotes an ith pilot channel, TVs denotes a channel interval of the DTV channel, and MS denotes a channel interval of the sub-channel.

According to example embodiments, wherein the second node device may select, as the adjacent channel, a sub-channel adjacent to the sub-channel selected as the pilot channel among the plurality of sub-channels.

According to example embodiments, wherein the second node device may calculate a correlation value between the energy level of the pilot channel and the energy level of the adjacent channel, and decide whether the corresponding DTV channel is the DTV channel selected as the available channel by comparing the calculated correlation value with a predetermined critical value.

According to still another aspect of the inventive concept, there is provided a method for discovering a neighbor of a node device in a TVWS communication environment, the method comprising: comparing energy levels of a first sub-channel and at least one second sub-channel adjacent to the first sub-channel among a plurality of sub-channels with respect to a DTV channel including the plurality of sub-channels and deciding whether the DTV channel is an available channel; and if the DTV channel is decided as the available channel, discover a beacon by scanning the first sub-channel in the DTV channel.

According to example embodiments, wherein the first sub-channel may be a sub-channel corresponding to the center frequency band of the DTV channel, and the second sub-channel may be a sub-channel corresponding to a frequency band adjacent to the center frequency band of the DTV channel.

According to example embodiments, wherein the frequency band of the second sub-channel may be continued to that of the first sub-channel.

According to example embodiments, wherein the frequency band of the second sub-channel may be not continued to that of the first sub-channel.

According to example embodiments, wherein the deciding of whether the DTV channel is the available channel may include: calculating a correlation value between the energy level of the first sub-channel and the energy level of the second sub-channel; and deciding whether the DTV channel is the available channel by comparing the calculated correlation value with a predetermined critical value.

According to example embodiments, wherein the correlation value may be calculated according to the following equation;

$$R_{xy} = \left| \frac{n\sum x_i y_i - \sum x_i \sum y_i}{\sqrt{n\sum x_i^2 - (\sum x_i)^2} \sqrt{n\sum y_i^2 - (\sum y_i)^2}} \right| (0 < R_{xy} \leq 1),$$

where x denotes the energy level of the first sub-channel, and y denotes the energy level of the second sub-channel.

According to example embodiments, wherein in the deciding of whether the DTV channel is the available channel, the energy level of the first sub-channel and the energy level of the second sub-channel may be measured by using CCA.

According to example embodiments, the method may further comprise, after the discovering of the beacon, performing a connection procedure on a TVWS network by using the discovered beacon.

[Publication 1] Jaebeom Kim et al., "Interleaving-based Orphan Channel Scanning for the IEEE 802.15.4m in TVWS Smart Grid Networks," Ubiquitous and Future Networks (ICUFN), 2015 Seventh International Conference, pp. 89-94, July 2015.

[Publication 2] Jaebeom Kim et al., "Efficient topology construction and routing for IEEE 802.15.4m-based smart grid networks," Wireless Networks, Vol. 21, No. 8, pp. 1-19, November 2015.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF THE EXEMPLARY EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

It is noted that the components of the inventive concept are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

A TV white space (TVWS) frequency band may be divided into a plurality of digital TV (DTV) channels according to a channel interval (bandwidth) of a DTV, and may be divided into a plurality of sub-channels according to a channel interval used by devices constituting a TVWS network.

For example, if a permitted TVWS frequency band ranges from 700 MHz to 820 MHz, and the channel interval of the DTV channels is set to 6 MHz, the TVWS frequency band may be divided into 20 DTV channels. In addition, if the permitted frequency band ranges from 700 MHz to 820 MHz, and the devices constituting the TVWS network use a channel interval of 600 KHz, the TVWS frequency band may be divided into 200 sub-channels.

Hereinafter, for convenience of illustration, it is described that a "DTV channel" includes a plurality of "sub-channels," and embodiments of the inventive concept will be described in detail.

Figure 1:
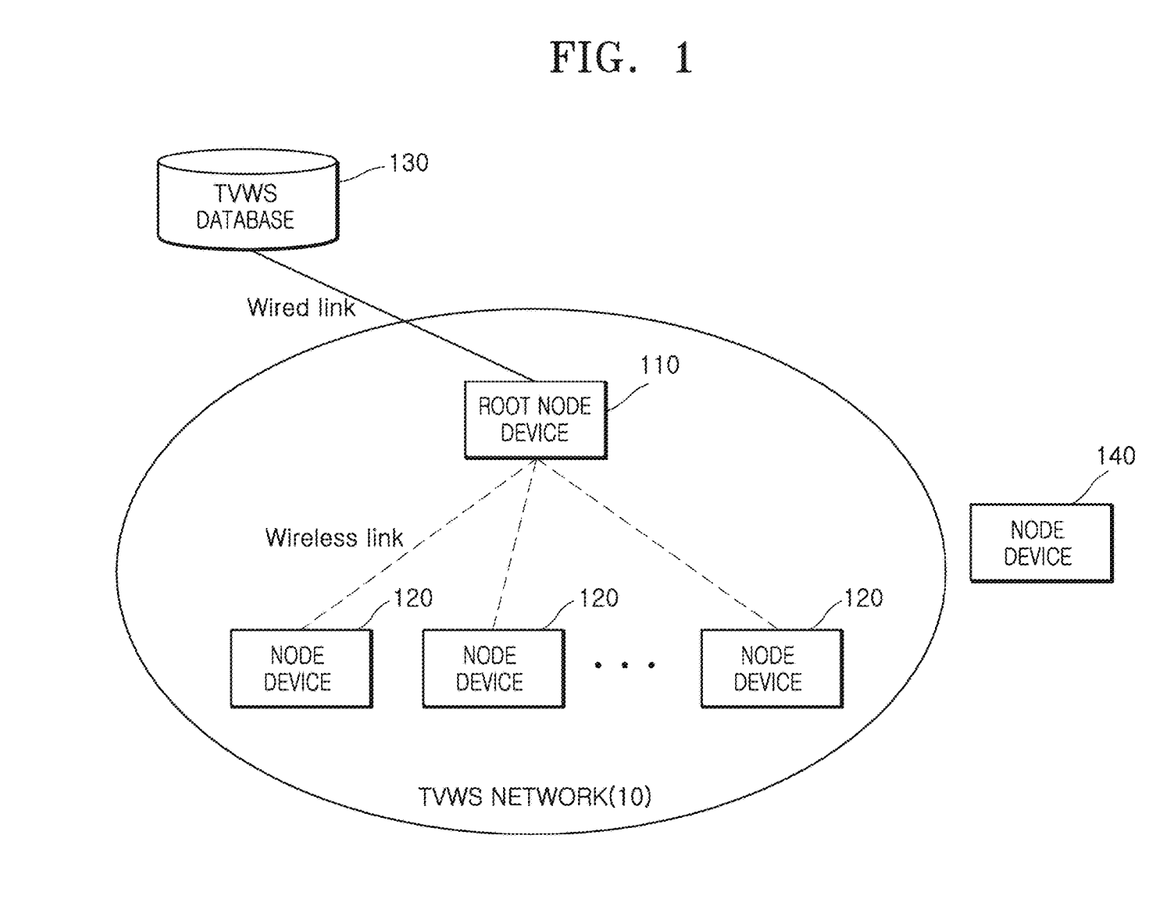
FIG. 1 is an exemplary diagram illustrating a TV white space (TVWS) network according to an embodiment of the inventive concept.

FIG. 1 is an exemplary diagram illustrating a TVWS network according to an embodiment of the inventive concept. The TVWS network 10 shown in FIG. 1, for example, may be implemented in various networks including a wireless local area network (WLAN), a wireless personal area network (WPAN), a wireless wide area network (WWAN), a wireless metropolitan area network (WMAN), and the like, which use a TVWS.

Referring to FIG. 1, the TVWS network 10 may include a root node device (or base station device) 110 and a plurality of node devices 120.

The root node device 110 may be connected to a TVWS network 130. The root node device 110 may acquire DTV available channel information (or DTV available channel list) from the TVWS database 130. The DTV available channel information may include information related to a TVWS frequency band available in a region in which the TVWS network 10 is built. Meanwhile, in FIG. 1, it is illustrated that the root node device 110 is connected by wire to the TVWS database 130, but the inventive concept is not limited thereto. The root node device 110 may be connected by wireless to the TVWS database 130.

The root node device 110 may select at least one DTV channel among a plurality of DTV channels, based on the DTV available channel information, and broadcast a beacon by using the selected DTV channel. The beacon may include information on a TVWS frequency band use condition.

The node device 120 may be a device connected to the TVWS network 10. The node device 120 may communicate by wireless with the root node device 110 and/or another node device by using a sub-channel corresponding to the available TVWS frequency band.

Meanwhile, according to an embodiment, the node device 120 may also broadcast a beacon by using a specific DTV channel. The node device 120 may broadcast a beacon transmitted from the root node device 110 by using the specific DTV channel. Alternatively, the node device 120 may generate a beacon, based on the beacon transmitted from the root node device 110, and broadcast the generated beacon by using the specific DTV channel.

When a node device not connected to the TVWS in a general TVWS network performs a procedure of discovering a neighbor to be connected to the corresponding TVWS network, the node device should discover a beacon by scanning sub-channels in all DTV channels, and therefore, a neighbor discovery delay is increased.

On the other hand, in the TVWS network 10 according to the embodiment of the inventive concept, interleaved channel scanning is applied, so that the neighbor discovery delay of a node device 140 that intends to connect to the TVWS can be reduced.

Specifically, the root node device 110 (or the node device 120) selects, as a pilot channel, at least one sub-channel among sub-channels in an available DTV channel and broadcasts a beacon by using the selected pilot channel. The node device 140 compares an energy level of a pilot channel of each of the plurality of DTV channels with an energy level of a sub-channel adjacent to the pilot channel without scanning all of the DTV channels and decides whether the corresponding DTV channel is an available DTV channel. Then, the node device 140 discovers a beacon by scanning only the pilot channel in the DTV channel decided as the available DTV channel. Accordingly, the neighbor discovery delay of the node device 140 can be reduced in the TVWS network 10.

Hereinafter, the root node device 110 and the node device 140 to implement the interleaved channel scanning will be described in detail with reference to FIGS. 2 to 4.

Figure 2:
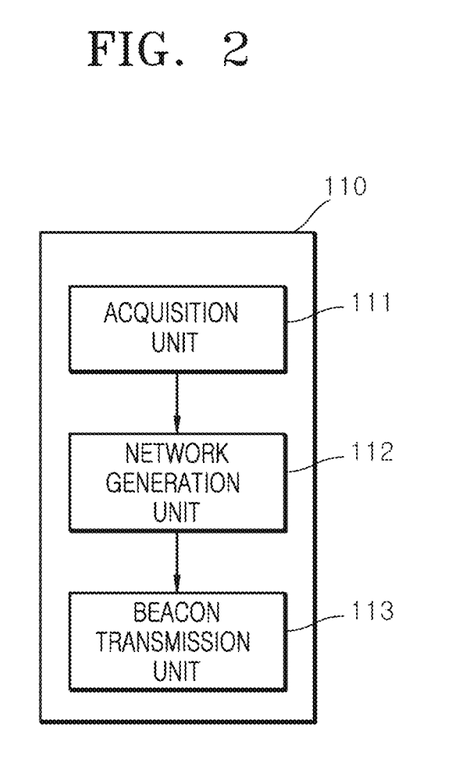
FIG. 2 is a diagram schematically illustrating some components of a root node device of FIG. 1.

FIG. 2 is a diagram schematically illustrating some components of the root node device of FIG. 1. FIG. 3 is an exemplary diagram illustrating a method in which the root node device of FIG. 1 selects a pilot channel.

Referring to FIG. 2, the root node device 110 may include an acquisition unit 111, a network generation unit 112, and a beacon transmission unit 113.

The acquisition unit 111 may be connected to the TVWS database 130 through, for example, Internet, and acquire DTV available channel information from the TVWS database 130. According to an embodiment, the acquisition unit 111 may acquire the DTV available channel information from another device except the TVWS database 130. The DTV available channel information may include DTV channel information related to an available TVWS frequency band.

The network generation unit 112 may generate a synchronized TVWS network by selecting an available DTV channel among a plurality of DTV channels.

The beacon transmission unit 113 may broadcast a beacon in a predetermined period by using the available DTV channel.

First, the beacon transmission unit 113 may select, as a pilot channel, at least one of sub-channels in the available DTV channel. In some embodiments, the beacon transmission unit 113 may determine, as the pilot channel, a sub-channel corresponding to the center frequency band of the available DTV channel according to the following Equation 1.

$$PilotChannel_i = \left(i \times \frac{TV_s}{M_S}\right) - \left(\frac{TV_s/M_S}{2}\right) \quad \text{Equation 1}$$

Here, $PilotChannel_i$ denotes an ith pilot channel, $TV_s$ denotes a channel interval of a DTV, and $M_S$ denotes a channel interval (i.e., an interval of a sub-channel) used by the devices of the TVWS network 10.

A method for selecting a pilot channel of the beacon transmission unit 113 will be described with further reference to FIG. 3. Here, it is assumed that the channel interval of the DTV channels is set to 6 MHz in the TVWS network 10, and the devices constituting the TVWS network 10 use a channel interval of 600 KHz. Therefore, one DTV channel may be divided into 10 sub-channels.

Figure 3:
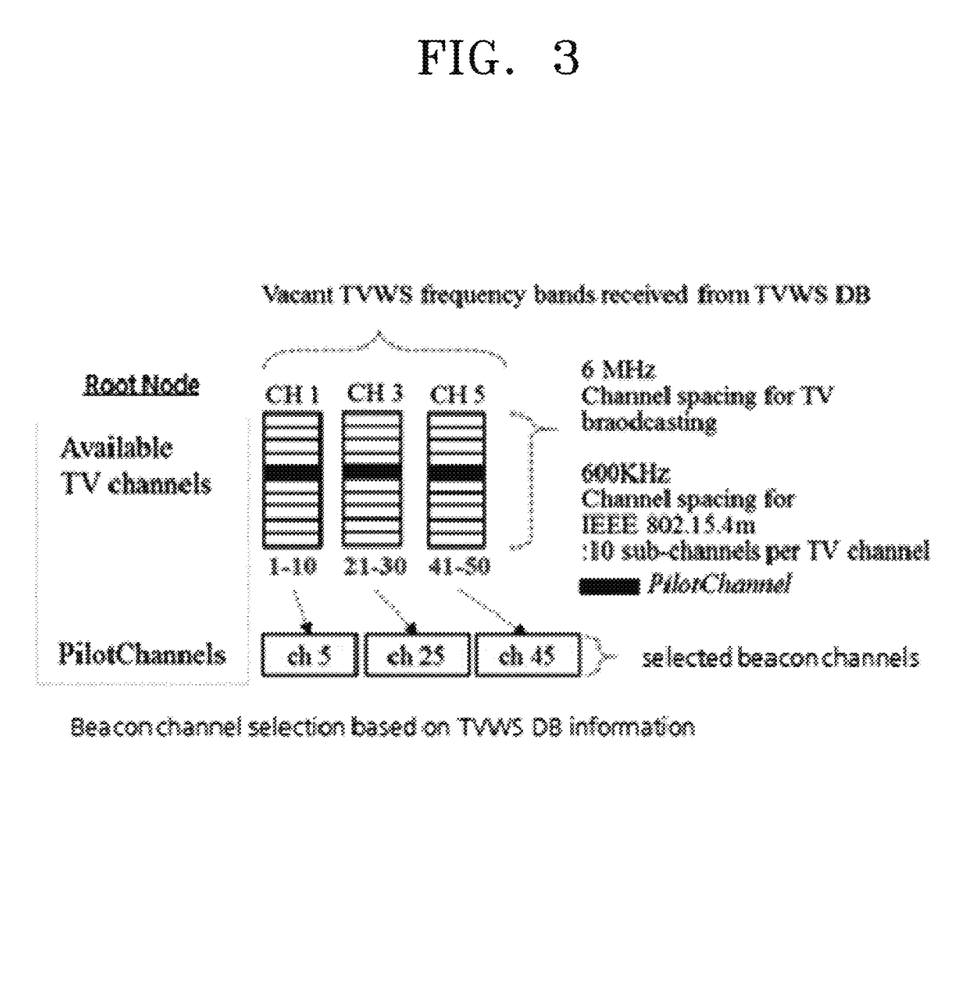
FIG. 3 is an exemplary diagram illustrating a method in which the root node device of FIG. 1 selects a pilot channel.

As shown in FIG. 3, the beacon transmission unit 113 may recognize that a first DTV channel, a third DTV channel, and a fifth DTV channel are available channels, based on the DTV available channel information acquired from the TVWS database 130 through the acquisition unit 111.

The beacon transmission unit 113 may select, as a pilot channel for transmitting a beacon, a sub-channel corresponding to the center frequency band of each of the first, third, and fifth DTV channels that are available channels according to Equation 1. For example, the beacon transmission unit 113 may select, as the pilot channel, a fifth sub-channel corresponding to the center frequency band of the first DTV channel. Similarly, the beacon transmission unit 113 may select, as the pilot channel, a twenty fifth sub-channel corresponding to the center frequency band of the third DTV channel, and may select, as the pilot channel, a forty fifth sub-channel corresponding to the center frequency band of the fifth DTV channel.

Referring back to FIG. 2, the beacon transmission unit 113 may broadcast a beacon by using the selected pilot channel.

Figure 4:
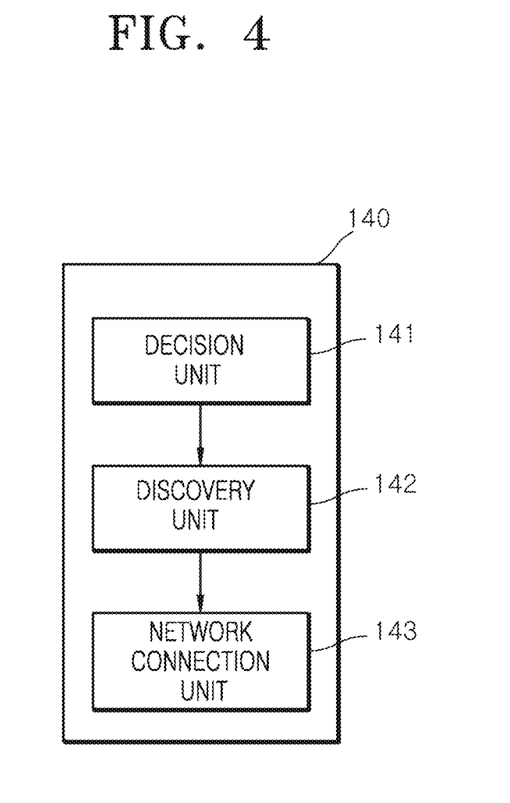
FIG. 4 is a diagram schematically illustrating some components of a node device of FIG. 1.
Figure 5:
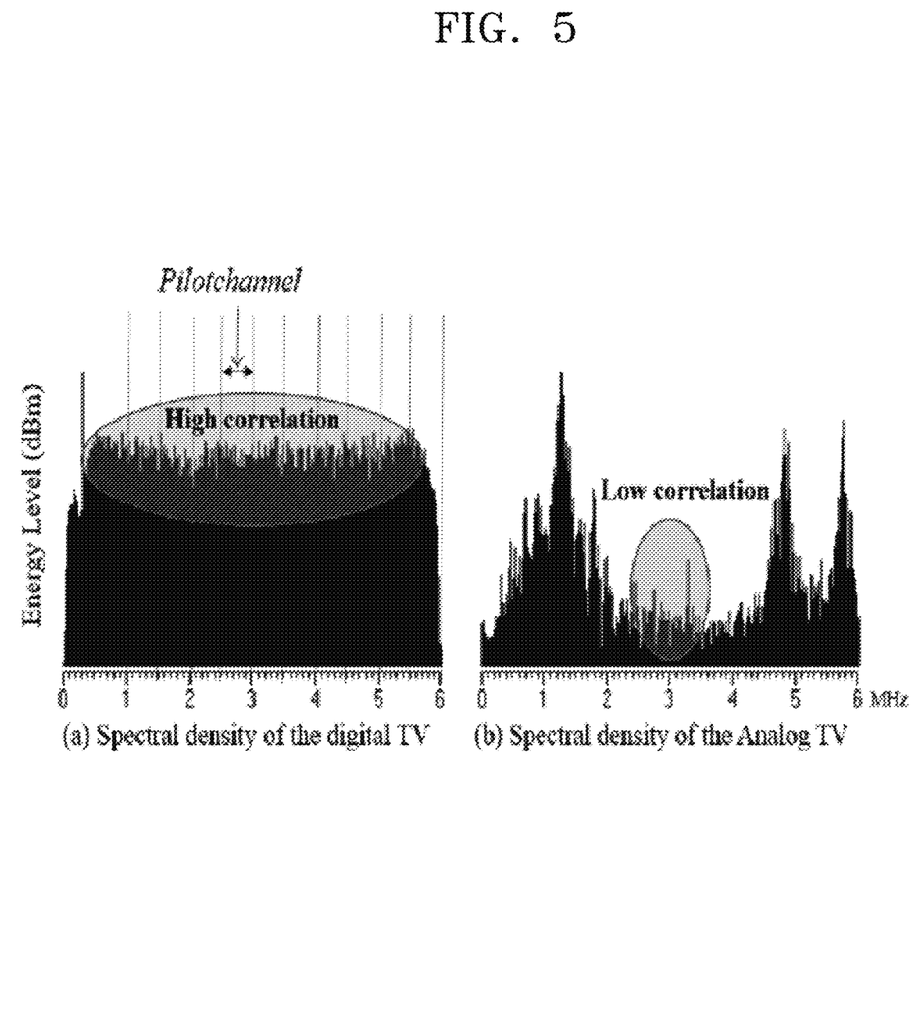
FIG. 5 is an exemplary diagram illustrating a spectral density of a digital TV (DTV) channel.
Figure 6:
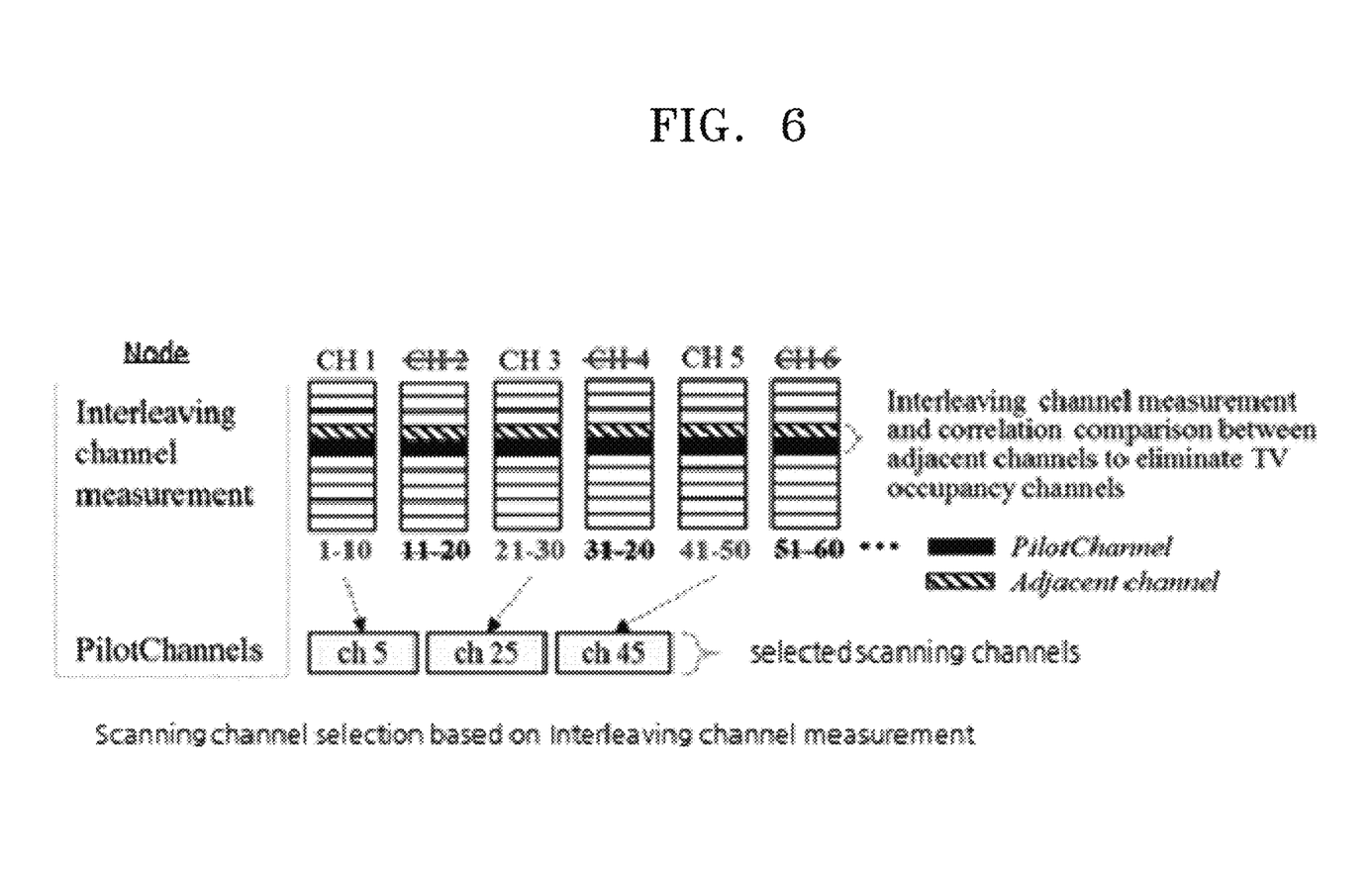
FIG. 6 is an exemplary diagram illustrating a method in which the node device selects a DTV channel to be scanned.

FIG. 4 is a diagram schematically illustrating some components of the node device of FIG. 1. FIG. 5 is an exemplary diagram illustrating a spectral density of a DTV channel. FIG. 6 is an exemplary diagram illustrating a method in which the node device selects a DTV channel to be scanned. Meanwhile, only the node device 140 that intends to connect to the TVWS network 10 is illustrated, but the node device 120 already connected to the TVWS network 10 may also have a configuration corresponding to that of the node device 140 shown in FIG. 4.

Referring to FIG. 4, the node device 140 may include a decision unit 141, a discovery unit 142, and a network connection unit 143.

The decision unit 141 may generate a scanning channel list including a plurality of DTV channel in the TVWS frequency band.

The decision unit 141 may compare an energy level of a first sub-file (pilot channel) of each of the plurality of DTV channels with an energy level of at least one second sub-channel (adjacent channel) adjacent to the first sub-channel and decide whether the corresponding DTV channel is an available channel or an occupied channel, so that the node device 140 does not perform scanning on all sub-channels in the plurality of DTV channels included in the scanning channel list.

Further referring to FIG. 5, when the average energy level (dBm) of the DTV channels is compared with that of analog TV channels, it can be seen that the average energy level of the DTV channels has a more stable pattern as compared with that of the analog TV channels. Thus, the decision unit 141 compares the energy level of the pilot channel that is a sub-channel corresponding to the center frequency band of a DTV channel with the energy level of the adjacent channel, to decide whether the corresponding DTV channel is an available channel or an occupied channel.

The decision unit 141 may select a pilot channel of each of the plurality of DTV channels by using a method corresponding to the method in which the root node device 110 selects a pilot channel, described with reference to FIGS. 2 and 3.

The decision unit 141 may select, as the adjacent channel, at least one sub-channel adjacent to the selected pilot channel. In some embodiments, the decision unit 141 may select, as the adjacent channel, a sub-channel neighboring to the pilot channel. That is, the frequency band of the selected adjacent channel may be continued to that of the pilot channel. In other embodiments, the decision unit 141 may select, as the adjacent channel, a sub-channel not neighboring to the pilot channel. That is, the frequency band of the adjacent channel may not be continued to that of the pilot channel.

The decision unit 141 may measure energy levels of the selected pilot channel and the adjacent channel by using, for example, clear channel assessment (CCA).

The decision unit 141 may calculate a correlation value between an energy level of the pilot channel and an energy level of the adjacent level according to a Pearson product moment correlation coefficient of the following Equation 2.

$$R_{xy} = \left| \frac{n\sum x_i y_i - \sum x_i \sum y_i}{\sqrt{n\sum x_i^2 - (\sum x_i)^2} \sqrt{n\sum y_i^2 - (\sum y_i)^2}} \right| \quad (0 < R_{xy} \leq 1) \quad \text{Equation 2}$$

Here, x is an energy level representing a CCA value of the pilot channel, and y is an energy level representing a CCA value of the adjacent channel.

Meanwhile, according to an embodiment, the decision unit 141 may calculate a correlation value between the energy levels of the pilot channel and the adjacent channel by using a different method from Equation 2.

The decision unit 141 may compare the calculated correlation value with a predetermined critical value and decide whether the corresponding DTV channel is an available channel or an occupied channel. More specifically, if the calculated correlation value is greater than the critical value (e.g., 0.8), the decision unit 141 may decide that the corresponding DTV channel is an occupied cannel. If the calculated correlation value is not greater than the critical value, the decision unit 141 may determine that the corresponding DTV channel is an available channel.

The decision unit 141 may remove, from the scanning channel list, a DTV channel decided as an occupied channel. Accordingly, the scanning channel list can include only DTV channels decided as available channels, and thus the node device 140 can perform scanning by using only the DTV channels decided as the available channels according to the scanning channel list.

The method in which the decision unit 141 selects a DTV channel to be scanned will be described in detail with reference to FIG. 6. As described with reference to FIG. 3, it is assumed that the channel interval of the DTV channels is set to 6 MHz in the TVWS network 10, and the devices constituting the TVWS network 10 use a channel interval of 600 KHz.

Like the root node device 110, the decision unit 141 may select, as a pilot channel, a sub-channel corresponding to the center frequency band of each of first to sixth DTV channels, and select, as an adjacent channel, a sub-channel adjacent to the pilot channel. For example, the decision unit 141 may select, as a pilot channel, a fifth sub-channel corresponding to the center frequency band of the first DTV channel, and select a fourth sub-channel as an adjacent channel.

The decision unit 141 may calculate a correlation value between an energy level of the selected pilot channel of each of the first to sixth DTV channels and an energy level of the adjacent channel, and decide whether each of the first to sixth DTV channels is an available channel by comparing the calculated correlation value with the critical value. In the case of the second, fourth, and sixth DTV channels already used among the first to sixth DTV channels, the calculated correlation value is to be greater than the critical value, and hence the decision unit 141 may decide only the first, third, and fifth DTV channels as available channels.

The decision unit 141 may remove the second, fourth, and sixth DTV channels decided as the occupied channels in the scanning channel list including all of the first to sixth DTV channels such that only the first, third, and fifth DTV channels decided as the available channels are included in the scanning channel list.

Referring back to FIG. 4, the discovery unit 142 may discover a beacon by scanning the pilot channel in the DTV channel, decided as the available channel, according to the scanning channel list. The discovery unit 142 may scan a beacon by sequentially scanning pilot channels of the DTV channels according to an order of the scanning channel list. However, the inventive concept is not limited thereto, and the discovery unit 142 may discover a beacon by arbitrarily scanning the pilot channels of the DTV channels without following the order of the scanning channel list.

The network connection unit 143 may perform a connection procedure on the TVWS network 10 by using the discovered beacon.

As described above, in the TVWS network 10 to which the interleaved channel scanning is applied, it is possible to remarkably reduce the number of channels that the node device 140 intending to connect to the TVWS network 10 scans so as to discover a beacon. Thus, a neighbor discovery delay can be reduced when the node device 140 performs a neighbor discovery procedure, and power consumption can be reduced as an unnecessary scanning operation is omitted. Accordingly, it is possible to improve the energy efficiency, survivability, and transmission quality of the TVWS network 10.

Figure 7:
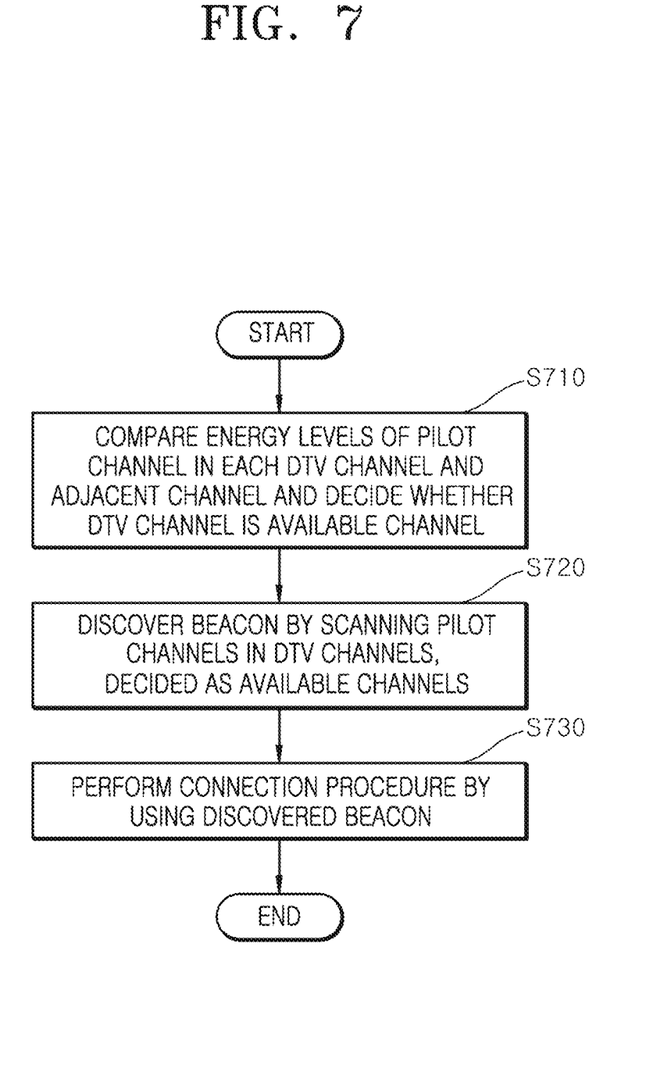
FIG. 7 is a flowchart illustrating a method for discovering a neighbor of a node device in a TVWS communication environment according to an embodiment of the inventive concept.

FIG. 7 is a flowchart illustrating a method for discovering a neighbor of a node device in a TVWS communication environment according to an embodiment of the inventive concept. Referring to FIG. 7, the method according to the embodiment of the inventive concept includes steps processed in time series by the node device 140 shown in FIGS. 2 and 4. Thus, the contents described above with respect to the node device 140 shown in FIGS. 2 and 4 can be applied to the method of FIG. 7 even though they are omitted below.

Referring to FIG. 7, in step S710, the node device 140 compares energy levels of a pilot channel in each of a plurality of DTV channels and an adjacent channel and decides whether the corresponding DTV channel is an available channel. Here, the node device 140 may select, as the pilot channel, a sub-channel positioned in the vicinity of the center frequency band of each of the DTV channels, and select, as the adjacent channel, at least one sub-channel adjacent to the sub-channel selected as the pilot channel.

More specifically, the node device 140 may calculate a correlation value between the energy levels of the pilot channel and the adjacent channel and then decide whether the DTV channel is an available channel by comparing the calculated correlation value with a predetermined critical value.

The node device 140 may remove DTV channels determined as occupied channels except the DTV channels determined as the available channels in a scanning channel list including all of the DTV channels.

In step S720, the node device 140 discovers a beacon by scanning the pilot channels in the DTV channels determined as the available channels. The node device 140 may sequentially scan the pilot channels in the DTV channels determined as the available channels according to the scanning channel list.

Subsequently, in step S730, the node device 140 performs a connection procedure on the TVWS network 10 by using the discovered beacon.

According to the above-described method, the node device 140 performs scanning on only some channels without scanning all channels so as to discover a beacon, so that a neighbor discovery delay can be reduced. Also, an unnecessary scanning operation is omitted, and thus power consumption can be reduced.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A node device using a TV white space (TVWS), comprising:
a transceiver configured to transmit/receive a beacon frame to scan a sub-channel in a digital TV (DTV) channel; and
a controller configured to:
compare energy levels of a first sub-channel and at least one second sub-channel adjacent to the first sub-channel among a plurality of sub-channels with respect to the DTV channel including the plurality of sub-channels,
decide whether the DTV channel is an available channel, and
discover the beacon frame by scanning the first sub-channel in the DTV channel if the DTV channel is decided as the available channel,
wherein the controller calculates a correlation value between the energy level of the first sub-channel and the energy level of the second sub-channel, and decides whether the DTV channel is the available channel by comparing the calculated correlation value with a predetermined critical value, and
wherein the correlation value is calculated according to the following equation;

$$R_{xy} = \left| \frac{n \sum x_i y_i - \sum x_i \sum y_i}{\sqrt{n \sum x_i^2 - (\sum x_i)^2} \sqrt{n \sum y_i^2 - (\sum y_i)^2}} \right| \quad (0 < R_{xy} \leq 1),$$

where x denotes the energy level of the first sub-channel, and y denotes the energy level of the second sub-channel.

2. The node device of claim 1, wherein the first sub-channel is a sub-channel corresponding to the center frequency band of the DTV channel, and the second sub-channel is a sub-channel corresponding to a frequency band adjacent to the center frequency band of the DTV channel.

3. The node device of claim 2, wherein the frequency band of the second sub-channel is continued to that of the first sub-channel.

4. The node device of claim 2, wherein the frequency band of the second sub-channel is not continued to that of the first sub-channel.

5. The node device of claim 1, wherein the controller measures the energy level of the first sub-channel and the energy level of the second sub-channel by using clear channel assessment (CCA).

6. The node device of claim 1, wherein the controller performs a connection procedure on a TVWS network by using the discovered beacon frame.

7. A TVWS network system, comprising:
a first node device including at least one controller, wherein the first node device is configured to select, as an available channel, at least one DTV channel among a plurality of DTV channels, based on acquired available channel information, and transmit a beacon frame by using a pilot channel in the DTV channel selected as the available channel; and
a second node device including at least one controller, wherein the second node device is configured to compare energy levels of a pilot channel in a DTV channel corresponding to each of the plurality of DTV channel and at least one adjacent channel, decide whether the corresponding DTV channel is the DTV channel selected as the available channel, and discover a beacon frame by scanning the pilot channel in the DTV channel selected as the available channel,
wherein each of the plurality of DTV channels includes a plurality of sub-channels, and
wherein the first node device and the second node device select any one of the plurality of sub-channels as the pilot channel according to the following equation;

$$PilotChannel_i = \left(i \times \frac{TV_s}{M_S}\right) - \left(\frac{TV_s/M_s}{2}\right),$$

where $PilotChannel_i$ denotes an ith pilot channel, $TV_s$ denotes a channel interval of the DTV channel, and $M_S$ denotes a channel interval of the sub-channel.

8. The network system of claim 7, wherein the second node device selects, as the adjacent channel, a sub-channel adjacent to the sub-channel selected as the pilot channel among the plurality of sub-channels.

9. The network system of claim 7, wherein the second node device calculates a correlation value between the energy level of the pilot channel and the energy level of the adjacent channel, and decides whether the corresponding DTV channel is the DTV channel selected as the available channel by comparing the calculated correlation value with a predetermined critical value.

10. A method for discovering a neighbor of a node device in a TVWS communication environment, the method comprising:
comparing energy levels of a first sub-channel and at least one second sub-channel adjacent to the first sub-channel among a plurality of sub-channels with respect to a DTV channel including the plurality of sub-channels and deciding whether the DTV channel is an available channel; and
if the DTV channel is decided as the available channel, discovering a beacon frame by scanning the first sub-channel in the DTV channel,
wherein the deciding of whether the DTV channel is the available channel includes:
calculating a correlation value between the energy level of the first sub-channel and the energy level of the second sub-channel; and
deciding whether the DTV channel is the available channel by comparing the calculated correlation value with a predetermined critical value, and
wherein the correlation value is calculated according to the following equation;

$$R_{xy} = \left| \frac{n\sum x_i y_i - \sum x_i \sum y_i}{\sqrt{n\sum x_i^2 - (\sum x_i)^2}\sqrt{n\sum y_i^2 - (\sum y_i)^2}} \right| \quad (0 < R_{xy} \leq 1),$$

where x denotes the energy level of the first sub-channel, and y denotes the energy level of the second sub-channel.

11. The method of claim 10, wherein the first sub-channel is a sub-channel corresponding to the center frequency band of the DTV channel, and the second sub-channel is a sub-channel corresponding to a frequency band adjacent to the center frequency band of the DTV channel.

12. The method of claim 11, wherein the frequency band of the second sub-channel is continued to that of the first sub-channel.

13. The method of claim 11, wherein the frequency band of the second sub-channel is not continued to that of the first sub-channel.

14. The method of claim 10, wherein in the deciding of whether the DTV channel is the available channel, the energy level of the first sub-channel and the energy level of the second sub-channel are measured by using CCA.

15. The method of claim 10, further comprising, after the discovering of the beacon frame, performing a connection procedure on a TVWS network by using the discovered beacon frame.

* * * * *